UNITED STATES PATENT OFFICE.

JOHANN CARL WILHELM RADEMACHER, OF HAMBURG, GERMANY, ASSIGNOR TO AMERICAN KITCHEN PRODUCTS COMPANY, OF NEW YORK, N. Y., A CORPORATION OF NEW YORK.

MEAT AND VEGETABLE EXTRACT IN THE FORM OF PORTABLE UNIT RATIONS AND PROCESS OF PRODUCING THE SAME.

1,007,142. Specification of Letters Patent. Patented Oct. 31, 1911
No Drawing. Application filed February 5, 1908. Serial No. 414,364.

*To all whom it may concern:*

Be it known that I, JOHANN C. W. RADEMACHER, a citizen of the German Empire, residing at Hamburg, Germany, have invented a new and useful Improvement in Meat and Vegetable Extract in the Form of Portable Unit Rations and Process of Producing the Same, of which the following is a specification.

This invention relates to a new product and process for preparing meat and vegetable extract in the form of portable unit rations, which process presents the advantage over processes hitherto known that the portable form of the extract substance which permits its ready division into unit rations is obtained without the addition of binding media.

The meat and vegetable extracts, in more or less solid form, which are mainly employed for the preparation of bouillon, sauces, gravies, etc., are obtained according to some of the processes hitherto known, in very inferior quality. On account of the mode of heating and evaporation employed for their manufacture, they lose nutritive value and possess insipid taste. According to other processes plasticity is imparted to the evaporated extract materials by adding binding media such as gelatin, isinglass, amylaceous matter, etc., so as to enable it to be molded. These binding media, however, can only be looked upon as a necessary evil in the preparation of the meat extract, and they likewise impair the flavor.

All these evils are avoided in the new process and the extracts after being boiled down are brought into the form required for obtaining portable unit rations without any treatment by means of powerful pressing machines or the like and without any addition of binding media as such. For this purpose substance consisting of meat extracts, vegetable extracts with or without the addition of fresh vegetables, salt and water if desired, for suitable working of the mass are mixed while heating for about half an hour to about 212° F. To this mixture is added salt and then the mass is evaporated to a doughlike consistency. This evaporation is performed at temperature of about 212° F. and lasts from about 1 to 2 hours. The requisite fat either of animal or vegetable origin, suitably treated and rendered and spices to suit taste are then added to the hot mass and the heating to about 212° F. is continued for a short time. It is then left to cool with constant stirring with a gradual cautious lowering of the temperature, in which process it will assume the desired consistency. Immediately before complete cooling and solidification it is placed in flat box molds and rolled flat to a thickness of about $\frac{3}{16}$ of an inch and permitted to cool completely at ordinary temperature. The mass is then cut out or stamped out into the shape of unit rations of pills, balls, tablets, cubes or the like. By this means there is no volatilization of the aromatic substances and the solid form required for the production of portable unit rations of the finished meat and vegetable extract is attained without any addition of substances which would impair the flavor.

By meat extract, I mean the constituents of meat that are soluble in water, including mineral salts, water soluble albuminoid matters and water soluble meat bases. By vegetable extract, I mean vegetable albumin which has been rendered soluble in water by well known means. By fat I mean fat of either animal or vegetable origin or a mixture thereof.

What I claim and desire to secure by Letters Patent is:

1. The herein-described process of producing a solid meat and vegetable extract in portable unit rations which consists in evaporating at or about the temperature of boiling water a mixture of meat extract, vegetable extract and salt to a doughlike consistency, adding thereto fat, and shaping the mass into portable unit rations, substantially as described.

2. A solid meat and vegetable extract comprising meat and vegetable constituents and fat.

3. A solid meat and vegetable extract consisting of a portable food ration comprising meat and vegetable extract constituents, and fat.

4. A solid meat and vegetable extract consisting of a cubical food ration, comprising meat and vegetable extract constituents, and fat which on dissolving in water will produce a cup of bouillon.

5. A solid meat and vegetable extract comprising meat and vegetable extract constituents, and fat, substantially free from added binding matter.

In testimony whereof I have hereunto set my hand in presence of two subscribing witnesses.

JOHANN CARL WILHELM RADEMACHER.

Witnesses:
CARL SCHEINBERGER,
ERNEST H. L. MUMMENHOFF.